United States Patent

Heymann

[15] 3,697,191

[45] Oct. 10, 1972

[54] EROSION CONTROL IN A STEAM TURBINE BY MOISTURE DIVERSION

[72] Inventor: Frank J. Heymann, Wilmington, Del.

[73] Assignee: Westinghouse Electric Corporation, Pittsburgh, Pa.

[22] Filed: March 23, 1971

[21] Appl. No.: 127,234

[52] U.S. Cl. ........................... 415/168, 415/DIG. 1
[51] Int. Cl. ............................................. F01d 1/00
[58] Field of Search ...... 415/121 A, 168, DIG. 1, 115

[56] References Cited

UNITED STATES PATENTS

| 741,776 | 10/1903 | Dodge | 415/121 A |
|---|---|---|---|
| 1,829,674 | 10/1931 | Rosenlocher | 415/168 |
| 2,291,828 | 8/1942 | New | 415/DIG. 1 |
| 2,399,009 | 4/1946 | Doran | 415/121 A |
| 3,058,720 | 10/1962 | Hart et al. | 415/168 |

FOREIGN PATENTS OR APPLICATIONS

| 316,381 | 8/1929 | Great Britain | 415/168 |
|---|---|---|---|
| 343,407 | 2/1931 | Great Britain | 415/168 |
| 1,013,835 | 12/1965 | Great Britain | 415/115 |

Primary Examiner—Henry F. Raduazo
Attorney—A. T. Stratton, F. P. Lyle and F. Cristiano, Jr.

[57] ABSTRACT

An annular array of circumferentially spaced nozzle blades having an airfoil shaped cross section on the low pressure stages of an axial flow steam turbine wherein the stationary nozzle blades have a first slot adjacent their trailing edge and adjacent a turbine casing, a second slot adjacent the trailing edge and adjacent a rotor and a conduit connecting the slots so that water collected on the stationary nozzle blades is aspirated by the first slot, flows through the conduit, and is ejected from the second slot in atomized form and approaches the rotating blades at a location where the tangential velocity of the rotating blades is substantially lower, thus reducing the erosive effect of the water droplets on the rotating blades of the turbine.

8 Claims, 8 Drawing Figures

EROSION CONTROL IN A STEAM TURBINE BY MOISTURE DIVERSION

BACKGROUND OF THE INVENTION

This invention relates to erosion control of rotatable blades of an axial flow steam turbine and more particularly to a nozzle structure adapted to aspirate water droplets which form on the nozzle blades adjacent the casing and eject the water in atomized form adjacent the rotor.

Erosion on low pressure blades in an axial flow steam turbine is caused by water droplets from the wet steam, which collect on the trailing edges of the nozzle blades adjacent the turbine casing and are swept off the nozzle blades by steam passing thereby. The droplets are large and move at relatively low velocities compared to the velocity of the tips of the rotating blades. Thus, as the large water droplets and rotating blades collide the impact is high resulting in erosion of the rotating blades.

Since the leading edges of the rotating blades of the low pressure stages are the primary erosion area it has been common practice to coat or form the tip of these blades of some hard material, such as Stellite; however, providing the erosion resistant edges is expensive, is not always adequate, and may weaken the blades. The rotating blades of the low pressure stages of the turbine may also be protected by providing a suction slot adjacent the trailing edge of the nozzle blades and connecting the slots directly to the condenser to draw the water directly to the condenser; however, this causes steam, which can do useful work, to also be extracted from the steam flow paths. Increasing the spacing between the rotating blades and the nozzle blades will increase the velocity of the water droplets and reduce the impact velocity of the water droplets as they impinge on the rotating blades. However, this increases the turbine length, weight and cost.

SUMMARY OF THE INVENTION

In general an axial flow steam turbine made in accordance with this invention has low pressure stages operable by steam having water droplets therein and has a rotor, a plurality of annular arrays of circumferentially spaced rotatable blades fastened to the rotor, a casing encircling the arrays of rotatable blades and the rotor, and an annular array of circumferentially spaced stationary nozzle blades fastened to the casing for directing steam against the rotatable blades. The stationary nozzle blades of at least one array of stationary nozzle blades each comprise a leading edge and a trailing edge, the trailing edge being adjacent the rotatable blades against which it directs steam, a first port adjacent the trailing edge and adjacent the casing, a second port adjacent the rotor, and a conduit connecting the ports. The ports and conduits are so disposed that water droplets collected on the nozzle blade are aspirated therefrom by the first port, flow through the conduit and are ejected from the second port in atomized form and approach the rotatable blades at a greater velocity than water droplets which are swept off the trailing edge of the nozzle blade by steam flowing thereby and at a location where the tangential velocity of the rotating blade is substantially lower, thus reducing the erosive effect of the water droplets on the adjacent array of rotatable blades against which the nozzle blades direct steam.

BRIEF DESCRIPTION OF THE DRAWINGS

The objects and advantages of this invention will become more apparent from reading the following detailed description in connection with the accompanying drawings, in which:

FIG. 3 is an enlarged partial sectional view of a stationary nozzle blade and an associated rotatable blade with a superimposed velocity diagram showing the velocity of the steam and the water droplets as the droplets are swept off the nozzle blade by the steam;

FIG. 4 is an enlarged partial sectional view of a stationary nozzle blade and an associated rotatable blade with a superimposed velocity diagram showing the velocities of the steam and atomized water droplets as the droplets approach the rotatable blade;

BRIEF DESCRIPTION OF THE PREFERRED EMBODIMENT

Figure 1:
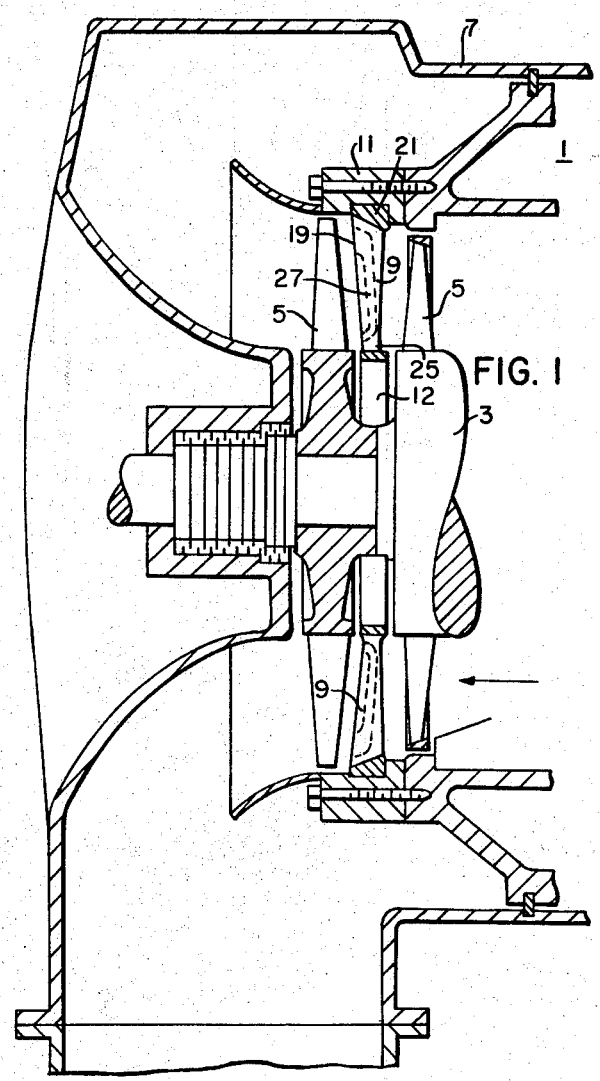
FIG. 1 is a partial sectional view of the low pressure stages of an axial flow steam turbine.

Referring now to the drawing in detail, FIG. 1 shows the low pressure stage of an axial flow steam turbine 1 having a rotor 3, a plurality of annular arrays of circumferentially spaced rotatable blades 5 fastened to the rotor 3, a casing 7 encircling the rotatable blades 5 and the rotor 3, and an annular array of circumferentially spaced stationary nozzle blades 9 interposed between two annular arrays of rotatable blades 5 and fastened to the casing 7 by an internal cylinder 11.

As shown in FIG. 1, the stationary nozzle blades 9 of the annular array of nozzle blades are fastened together adjacent the rotor 3 by a shroud ring 12 subtending the annular array of stationary nozzle blades. The nozzle blades 9 have a rounded leading edge 13 adjacent the upstream side thereof, the right edge as shown in the drawings, a relatively sharp trailing edge 15, the downstream edge or left edge as shown in the drawings, and an airfoil shaped cross section. The airfoil shaped cross section is curved to change the direction of the motive steam as it passes through the stationary nozzle blades; thus each nozzle blade has a concave and convex surface or portion 16 and 17, respectively.

Figure 2:
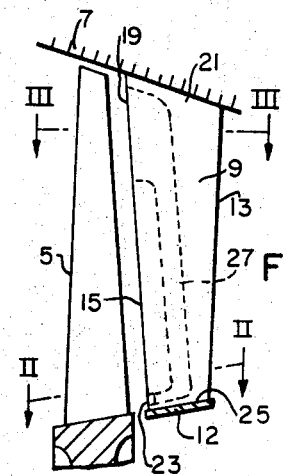
FIG. 2 is an enlarged partial sectional view of a stationary nozzle blade and a rotatable blade made in accordance with this invention.
Figure 8:
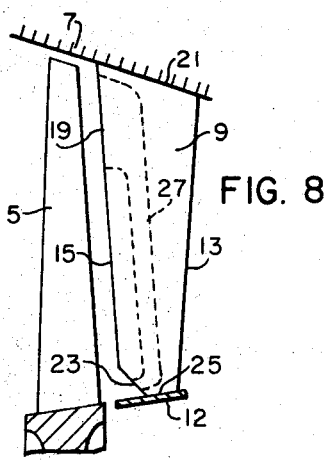
FIG. 8 is an enlarged partial sectional view of a stationary nozzle blade and a rotatable blade wherein the nozzle blade is tapered adjacent the rotor.
Figure 5:
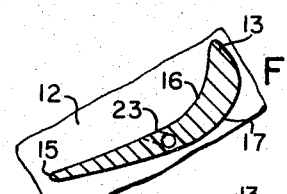
FIG. 5 is an enlarged partial sectional view of a stationary nozzle blade showing the disposition of the second port in a concave portion of the stationary nozzle blade.
Figure 6:
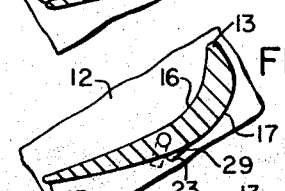
FIG. 6 is an enlarged partial sectional view of a stationary nozzle blade showing the disposition of the second port in a convex portion of the stationary nozzle blade.
Figure 7:
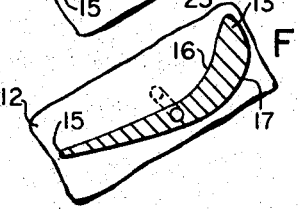
FIG. 7 is an enlarged partial sectional view of a stationary nozzle blade showing the second port disposed in a shroud ring.

As shown in FIG. 2, a first port 19 is disposed adjacent the trailing edge 15 of the nozzle blade 9 and adjacent the casing end or root 21 of the nozzle blade 9. The first port 19 is shown in FIG. 2 to be a slot extending lengthwise of the nozzle blade.

A second port 23 is disposed on or adjacent the trailing edge 15 of the nozzle blade 9 and radially inwardly respect to the first port 19 or adjacent the rotor end 25 of the nozzle blade 9. A conduit 27 connects the ports 19 and 23 so that water droplets collected on the nozzle blade 9 are aspirated therefrom by the first port 19, flow through the conduit 27, are ejected from the second port 23 and approach the rotatable blades at a greater velocity than water droplets, which would be swept off the trailing edge 15 of the nozzle blades by steam flowing thereby if the ports 19 and 23 were not so disposed, thus reducing the erosive effect of the water droplets on the rotatable blade.

The reduction in erosion of the rotating blades caused by water impinging thereon is a result of increasing the velocity of the water droplets decreasing the mass of the droplets and causing the water droplets to impinge on the blades adjacent the rotor, where the rotating blade velocity is at a minimum, rather than adjacent the blade tips, where the rotating blade velocity is at a maximum. This may be better understood by referring to the vector diagrams in FIGS. 3 and 4. The vector diagram in FIG. 3 shows the steam velocity OA as it leaves the nozzle blades 9; the velocity of the water droplets CA being swept off the trailing edge 15 of the nozzle blade 9 by the steam, when the nozzle blades are not made in accordance with this invention; the velocity of the rotating blades AB; the velocity of the steam relative to the rotating blades OB; and the velocity of the water droplets relating to the rotating blades CB. The absolute velocity of the water droplets relative to the rotating blades is only slightly less than the absolute velocity of the rotating blades, but, as noted in the velocity diagram, is in the opposite direction. Thus, the water droplets will collide with the rotating blades 5 at a velocity close to the velocity of the rotating blades and the impact of the water droplets on the rotating blades causes erosion adjacent to the leading edge of the rotating blades. The vector diagram of FIG. 4 shows the steam velocity O'A' as it leaves the nozzle blade 9; the velocity of the atomized water droplet C'A' as the droplets approach the rotating blade; the velocity of the rotating blades A'B'; the velocity of the steam relative to the rotating blades O'B'; and the velocity of the atomized water droplets relative to the rotating blades C'B', which is the velocity at which the water droplets collide with the rotating blades. It should be noted that the absolute value of the velocity of the water droplets relative to the rotating blade C'B' is substantially less than the absolute value of the velocity CB. This is mainly due to the fact that the velocity of the rotating blade is lower adjacent the rotor and in part due to the fact that the velocity of the atomized water droplets is greater as they approach the rotating blades.

The differential static pressure has a ratio of approximately 2:1 between the area adjacent the casing and the area adjacent the rotor. The higher pressure adjacent the casing or tip region of the rotating blades is created by the centrifugal compression of the steam as the rotatable blades revolve. The rotation of the rotatable blades also causes the water droplets to sling outwardly toward the casing, thus the majority of the moisture in the steam will collect on the stationary blades adjacent the casing. With the pressure of the steam adjacent the rotor about one-half the pressure of the steam adjacent the casing, there is sufficient pressure differential to cause water droplets aspirated by the first port to flow to the second port so that by providing a small aperture at the second port the water droplets will break up into small atomized droplets. Since the atomized droplets have less mass, their acceleration by the steam is greater and their absolute velocity as they approach the rotating blades is greater, thus their impact velocity is less, and the impact and erosion effect on rotating blades is reduced considerably, for the erosion varies generally as the fifth power of the impact velocity.

To further increase the velocity of the water droplets, the second port 23 may be disposed in the convex portion of the nozzle blade 9 adjacent the rotor 3. At this location the pressure of the steam is at its minimum, thus the pressure differential between the first and second port 19 and 23, respectively, is at its maximum; however, the boundary layer is thick and sensitive to disturbance. Therefore, to increase the pressure differential to its maximum and provide good atomization, a protrusion or knob 29 is disposed on the convex surface 16 of the nozzle blade 9 adjacent the rotor 3. The second port 23 is disposed in the protrusion 29, as shown in FIG. 6. The protrusion 29 projects beyond the boundary layer to provide the optimum pressure differential between the two ports.

The second port 23 may also be disposed in the concave portion 16 of the nozzle blade 9, as shown in FIG. 5. While the boundary layer is thinner and less sensitive to disturbance the static pressure is slightly higher adjacent this portion of the nozzle blade, thus reducing the pressure differential between the two ports.

FIG. 8 shows the trailing edge 15 of the nozzle blade 9 adjacent the rotor 3 tapered inwardly away from the rotating blade 5 against which it directs steam. The second port is disposed in the tapered portion of the nozzle blades to increase the distance the atomized water droplets travel with the steam causing an increase in their velocity and a reduction in the impingement velocity of the droplets on the rotating blades.

As shown in FIG. 7 the second port 23 is disposed in the shroud ring 12 and can be so disposed as to admit the water droplets at any distance from the rotating blades to optimize the atomization of the droplets and their velocity.

Atomizing the water droplets decreases their mass, provides them with an initial velocity as they leave the second port and allows them to accelerate rapidly in the steam flow stream so that as they approach the rotating blades adjacent the rotor, where the velocity of the rotating blade is at its minimum, the water droplets' impingement velocity on the rotating blades is minimized, thus reducing the erosive effect of the water droplets on the rotating blades.

What is claimed is:

1. An axial flow steam turbine having low pressure stages operable by motive steam having water droplets therein, the turbine having a rotor, a plurality of annular arrays of circumferentially spaced rotatable blades fastened to said rotor, a casing encircling said array of rotatable blades and said rotor, and a plurality of annular arrays of circumferentially spaced stationary nozzle blades fastened to said casing for directing steam against said blades, said nozzle blades of at least one array of stationary nozzle blades comprising a leading edge and a trailing edge, said trailing edge being adjacent said rotatable blades against which it directs steam, a first port adjacent said trailing edge and adjacent said casing, a second port adjacent said rotor and spaced radially inwardly of the first port and so disposed to be in communication with the motive steam at a lower pressure than the first port, and a conduit connecting said ports, said ports and conduits being so disposed that water droplets collected on said nozzle blade are aspirated therefrom by the first port, flow through said conduit, and are ejected from said second port in atomized form and at a greater velocity than water droplets being swept off the trailing edge of said nozzle blade by steam flowing thereby, thus reducing the erosive effect of the water droplets on said rotatable blades.

2. An axial flow steam turbine as set forth in claim 1, wherein the first port is a slot extending lengthwise of the nozzle blade.

3. A turbine as set forth in claim 1, wherein the nozzle blades of the one array of nozzle blades have a rounded leading edge, a relatively sharp trailing edge, and an airfoil shaped cross section, which is curved to change the direction of the steam flowing through the nozzle blades, the second port being disposed in the concave portion of the nozzle blade.

4. An axial flow steam turbine as set forth in claim 1, wherein the nozzle blades of one array of nozzle blades have a rounded leading edge, a relatively sharp edge and an airfoil shaped cross section which is curved to change the direction of the steam flowing thereby, the second port being disposed in the convex portion of the nozzle blade.

5. A turbine as set forth in claim 4, wherein the nozzle blades of the one array of stationary nozzle blades have a protrusion disposed in the convex portion thereof adjacent the rotor and the second port is disposed in said protrusion.

6. A turbine as set forth in claim 4, wherein the nozzle blades of the one array of stationary nozzle blades have a protrusion disposed in the convex portion thereof adjacent the rotor, said protrusion extending beyond a boundary layer of steam flowing thereby and the second port being disposed in said protrusion.

7. An axial flow steam turbine as set forth in claim 1, further comprising an inner shroud ring fastened to the array of stationary nozzle blades adjacent the rotor, the second port being disposed in said shroud ring.

8. A turbine as set forth in claim 1, wherein the nozzle blades of the one array of stationary nozzle blades are tapered adjacent the rotor to increase axial spacing between the nozzle blades and the rotatable blades, the second port being disposed in said tapered portion of the nozzle blades.

* * * * *